United States Patent [19]
Gordon

[11] Patent Number: 5,329,965
[45] Date of Patent: Jul. 19, 1994

[54] HYBRID VALVING SYSTEM FOR VARYING FLUID FLOW RATE

[75] Inventor: Daniel J. Gordon, Newtown, Conn.

[73] Assignee: The Perkin-Elmer Corporation, Norwalk, Conn.

[21] Appl. No.: 100,596

[22] Filed: Jul. 30, 1993

[51] Int. Cl.$^5$ ............................................. F16K 11/20
[52] U.S. Cl. ...................................... 137/599; 251/11
[58] Field of Search .................. 137/599, 601; 251/11

[56] References Cited

U.S. PATENT DOCUMENTS

| | | | |
|---|---|---|---|
| 2,999,482 | 9/1961 | Bower | 121/38 |
| 3,038,449 | 6/1962 | Murphy et al. | 137/599 X |
| 3,726,296 | 4/1973 | Friedland et al. | 137/1 |
| 3,746,041 | 7/1973 | Friedland | 137/599 |
| 3,937,248 | 2/1976 | Hutton | 137/599 X |
| 4,030,523 | 6/1977 | Gram et al. | 137/599 |
| 4,313,465 | 2/1982 | Holzem et al. | 137/599 |
| 4,628,961 | 12/1986 | Lew | 137/599 |
| 4,768,544 | 9/1988 | Beam et al. | 137/315 |
| 4,821,997 | 4/1989 | Zdeblick | 251/17 |
| 4,858,636 | 8/1989 | Adkins | 137/599 X |

OTHER PUBLICATIONS

"The Fluistor Microstructure is Poised for Commercialization" (author unknown), Sensor Business Digest, Feb., 1992, pp. 9-11.

Primary Examiner—Stephen M. Hepperle
Attorney, Agent, or Firm—H. S. Ingham; E. T. Grimes; J. R. Wahl

[57] ABSTRACT

In a fluid valving system, binary fluid control lines are connected in parallel between a common fluid inlet and a common fluid outlet. Each line has a binary valve and a metering orifice for passing a predetermined rate of fluid flow. The rates are in a geometric progression in factors of two. An analog fluid control line is connected in parallel with the binary lines, and has a continuously adjustable flow rate regulator for passing any selected rate of fluid flow up to a maximum at least equal to the largest increment of rate change in the binary lines. The regulator is formed of a miniature solid state device. A controller sets each binary valve open or closed, and sets the regulator for a selected flow rate, such that cooperative settings provide for a smoothly variable rate of total fluid flow.

8 Claims, 2 Drawing Sheets

HYBRID VALVING SYSTEM FOR VARYING FLUID FLOW RATE

This invention relates to the varying of fluid flow rates and particularly to a hybrid of binary and analog control of fluid flow rates.

BACKGROUND OF THE INVENTION

There are many requirements as well as metering devices for maintaining and changing fluid flow rates. For example, in certain applications it is necessary to turn on or shut off a preset fluid flow over a short period of time. Another type of application is where a flow rate must be selected with precision, for example, for carrier gas in atomic absorption spectrometric instruments, or in gas or liquid chromatography. In such instruments with electronic and computerized controls, the older conventional methods such as motors connected to conventional flow meters for setting and changing flows have become cumbersome and not readily adaptable, particularly where precision is required.

Most conventional flow meters are adjustable continuously over the operational range of flow rates and may not have the required precision. Another class of flow controllers utilizes an arrangement of binary flow control devices. These place a plurality of fluid lines in parallel, each having an on-off valve in series with a fixed flow control such as a precision orifice. The orifice is a different size in each line, or in at least some of the lines, so that combinations selected with the valves select fluid flow rate in increments. In one type of system, each fixed flow line passes fluid at a rate that is a factor of two greater than a preceding line in a sequence of the lines, as disclosed in U.S. Pat. Nos. 2,999,482, 3,726,296, 3,746,041 and 4,768,544. Other relative orifice sizes may be combined, for example as disclosed in U.S. Pat. No. 4,030,523 to attain steps in increments of 10% of the maximum flow, and U.S. Pat. No. 4,628,961 which discloses a stepper valve with equal flows.

A more recent class of devices for controlling fluid flow rates are formed in miniature solid state semiconductor chips and other materials using techniques similar to those of forming integrated electronic circuits. Such devices and techniques are described in detail in U.S. Pat. No. 4,821,997. A specific device is a Fluistor ™ as described in an article "The Fluistor Microstructure is Poised for Commercialization" (no author), Sensor Business Digest, 1, No. 5, 9–11 (February 1992).

SUMMARY OF THE INVENTION

Accordingly, an object is to provide a novel system for varying fluid flow rate with precision. Another object is to provide such a system that will control moderate or relatively large rates of fluid flow with precision.

The foregoing and other objects are achieved by a hybrid valving system for varying fluid flow rate. A plurality of binary fluid control lines are connected in parallel between a common fluid inlet and a common fluid outlet. The binary lines each have therein a binary valve and a metering means for passing a predetermined rate of fluid flow to the common outlet; in one aspect the metering means consists of a solid member with an orifice therethrough. The predetermined rates are chosen cooperatively such that sequentially selected binary lines, separately or in combination, provide for sequentially increased rates of total fluid flow in increments including a largest increment.

An analog fluid control line is connected in parallel with the binary lines between the common fluid inlet and the common fluid outlet. The analog line has therein a continuously adjustable flow rate regulator for passing any selected rate of fluid flow up to a maximum rate at least equal to the highest incremental rate change. Preferably the flow rate regulator is formed of a miniature solid state device. The system further includes a controller for setting each binary valve in a selected open or closed position, and for setting the flow rate regulator for a selected rate of fluid flow through the analog line, such that cooperative settings provide for a smoothly variable and selectable rate of total fluid flow.

The binary lines generally comprise a primary line and one or more secondary lines, the binary lines preferably having a sequential order of increasing predetermined flow rates. In one embodiment, the predetermined rate for each secondary line is twice the predetermined rate for its preceding binary line in the sequential order, and the flow rate for the primary line is lowest of the predetermined rates. In another embodiment, the predetermined rate for the primary line is lowest and the rate for each secondary line is greater than the rate for its preceding binary line by a flow increment equal to twice the primary rate.

DETAILED DESCRIPTION OF THE INVENTION

Figure 1:
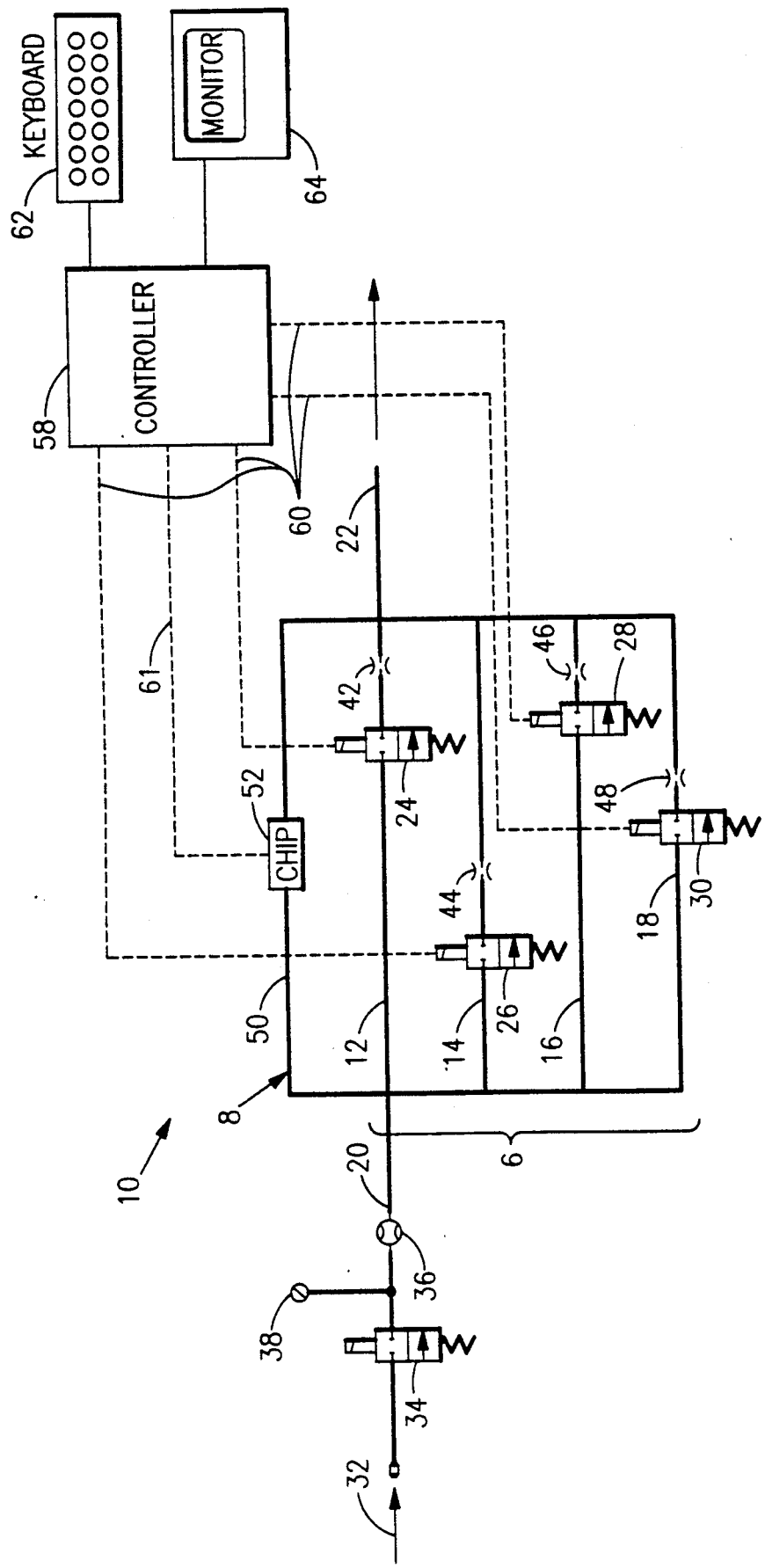
FIG. 1 is a schematic diagram of a fluid flow valving system according to the invention.

A hybrid valving system 10 according to the invention comprises two sections, namely a binary section 6 and an analog section 8 for fluid flow. Such a system may be utilized for liquid or gas flow control, such as carrier gas control for injecting a sample substance into a flame in an atomic absorption spectrometric instrument, or for carrier gas or liquid respectively in gas or liquid chromatography.

In the binary section 6 a plurality of lines with on-off valves and metering devices are used in a manner similar to those described in any of the foregoing patents related to binary fluid flow. In the present example of four such lines, a first line 12, a second line 14, a third line 16 and a fourth line 18 as shown, are arranged in parallel between a common fluid inlet line 20 and a common fluid outlet line 22. The outlet discharges the gas to a point of utilization (not shown). Each line has a gas passage therethrough with a binary gas valve which is opened or closed; thus for the four control lines there are correspondingly a first valve 24, second valve 26, third valve 28 and fourth valve 30 in each of the passages. The valves are electrically actuated, such as solenoid valves. Examples of potentially useful valving are taught in the aforementioned patents on binary valves.

The binary valving system 6 is connected to a source of pressurized gas 32 via inlet line 20 having therein a main gas switching valve 34 and a flowmeter 36 for measuring total flow rate. A conventional pressure gauge 38 may be attached to the input line.

Each control line further has therein a gas metering constriction, respectively 42, 44, 46, 48 which, at any given gas pressure, establishes a predetermined rate of gas flow through the corresponding passage when the binary valve is open. For versatility the constrictions may be effected by adjustable valves such as needle valves (not shown). Normally, however, once these valves are set they are left alone in particular settings. Alternatively, advantageously, the constrictions are precision orifices in a solid member, for example a sapphire member with orifices sold by O'Keefe Controls Co., Trumbull, Conn.

In one embodiment, the binary flow rates are in a geometric progression of factors of two. Constriction 42 for the first, i.e. primary, control line 12 is selected (with primary valve 24 open) to effect the lowest flow rate of all of the control passages. This lowest rate defines a "unitary rate". Each of the other control lines, namely the second, third and fourth lines herein termed "secondary" lines, are in a sequential order of increasing flows related to the constrictions. Second constriction 44 effects in line 14 twice the flow rate of its sequentially preceding control line 12. Third constriction 46 effects in line 16 twice the flow rate of its sequentially preceding control line 14. Fourth constriction 48 effects in line 18 twice the flow rate of its sequentially preceding control line 16. Additional control lines (not shown) in parallel would have similar relationships. Thus, with the first control line 12 providing a unitary flow of "one" the second line 14 provides a flow of "two" the third line 16 provides a flow of "four" and the fourth line 18 provides a flow of "eight".

The binary section is operated with the various binary valves on or off in selected combinations. With only the first (primary) valve 24 on, the flow is unitary; with only the second (first secondary) valve 26 on, the flow is two (twice unitary); with only valves one and two on, the flow is three; with only the third valve 28 on, the flow is four; with only valves one and three on, the flow is five; and so on to a maximum flow of fifteen with all valves (including valve 30) open. Thus a range of flows is provided in increments of unity, i.e. the value of the primary flow. The number of flow steps (including zero flow with all valves off) is $2^n$ where n is the number of valves; in the present example n=4, so that the number of binary steps is 16. It will be appreciated that actual flows are dependent on fluid pressure at the common inlet. Such pressure is held constant for the present purposes.

As a practicality, the metering means generally cannot be selected in exact multiples. Also, as explained more fully later herein, other binary progressions with different flow increments between sequentially increasing flow rate steps may be utilized. In any case a largest increment should be identified. In the instance of fully equal increments, the term "largest increment" herein means the value of eight.

The analog section 8 of the system 10 includes an analog fluid control line 50 connected in parallel with the binary section 6 between the common fluid inlet 20 and the common fluid outlet 22. The analog line has therein a continuously adjustable flow rate regulator 52 for passing a known rate of fluid flow from nil up to a maximum rate at least equal to the largest increment of flow rate of the binary section. The analog section thus fills in a continuous adjustment over the primary range of flow.

By setting this regulator in cooperation with the binary flow settings, a smoothly variable and selectable rate of total fluid flow is provided. In the case of four binary lines with the sequentially doubled rates of the present example, the total fluid flow is sixteen (or slightly higher) with the analog line included. The maximum rate of the analog line advantageously should be only nominally greater (e.g. up to 50%) than the incremental rate so as to fully fill the increments while maintaining nearly maximum sensitivity of the analog flow regulator.

The analog regulator 52 may be any desired or conventional flow rate controller such as a calibrated needle valve set by motor drive. Preferably, however, the analog valve is formed of a miniature solid state device formed in a semiconductor chip utilizing techniques and added materials similar to those of forming integrated electronic circuits as described in the aforementioned U.S. Pat. No. 4,821,997. For example, a suitable type of device is described as a Fluistor TM for a device of Redwood Microsystems, Inc., Menlo Park, Calif., in the aforementioned article. A similar device is a gas microvalve Model 4425 sold by IC Sensors, Milpitas, Calif. As used herein and in the claims, the term "solid state device" refers to such type of miniature valve formed in a chip.

The above-mentioned Redwood Fluistor has a silicon chip body with an enclosed cavity bounded by a single-crystal silicon diaphragm that is flexed by an expandable liquid sealed into the cavity. An electric resistance heater heats the liquid to expand it. A pyrex wafer is moved by the diaphragm to modulate fluid flow rate (responding to heating current through the resistance) in a passage through the body. Sensors and electronic components are advantageously included in the silicon chip, associated cooperatively with the heater to provide closed-loop flow control.

A controller 58 is included in the system 10 for setting, via electrical lines 60, each binary valve 24, 26, 28, 30 in section 6 in a selected open or closed position, and for setting the flow rate regulator 52, via electrical line 61, for a selected rate of fluid flow through the analog line 50, such that cooperative settings provide for a smoothly variable and selectable rate of total fluid flow over the entire range. The controller may be simply a set of manual knobs; however, the system is particularly suitable with computerized controls. Such controls may be included in computer programming associated with the point of utilization for the gas flow system, such as an instrument as previously mentioned.

The computer programming translates a selected flow value into signals on lines 60, 61, the flow valve being determined from an operator input via a keyboard 62, or as a previously entered saved value, or from a value calculated by a master program for the instrument associated with operation thereof. Flow rate, as well as instrument data and other information, may be displayed on a monitor 64. The programming means for setting the valving is conveniently and readily achieved with a conventional computer language such as "C" generally available through the supplier of the operating system utilized with the computer. The overall program may be compiled, for example, on a Digital Equipment Corporation Model 316+ computer that may be associated with the instrument. The nature of the electrical signal (e.g. digital or analog) to the solid state device should be provided in accordance with the manufacturer's instructions for the device.

The foregoing description is given with respect to four binary lines in geometric progression which, with the analog section, provides a total flow of sixteen (or nominally higher) based on the primary flow. Other numbers of binary lines may be chosen in conjunction with the analog section to provide a desired total flow range and sensitivity utilizing an available analog flow rate regulator with an appropriate maximum flow rate matched to the flow increments of the binary section.

Also, the foregoing is directed to an embodiment with the binary flows in geometric progression of factors of two, which makes efficient use of a minimum number of binary lines, especially for more than four lines. However, other configurations may be used, for example, as disclosed in the aforementioned U.S. Pat. No. 4,030,523. The latter provides for four respective binary line flows of unity, two, two and five to yield 10% increments in ten steps. Equal binary flows may even be used, as taught in the aforementioned U.S. Pat. No. 4,628,961.

In another embodiment, the predetermined rate for the primary line is lowest and the rate for each secondary line is greater than the rate for its preceding binary line by a flow increment equal to twice the primary rate. For four lines the flows are one (unity), three, five and seven. This provides for flow increments of one (e.g. between total flows of 3 and 4) or two (e.g. between total flows of 1 and 3). Thus the highest incremental rate change for the binary section is two, so the analog line is selected to provide zero to two. This combination yields a maximum flow of 18.

Flow orifice sizes and corresponding flow rates need not be available or selected in exact proportions. Thus, more generally according to the invention, the binary flows provide for increased rates of total fluid flow in predetermined increments (which need not be the same) including an increment with a highest incremental rate change. The analog line has an adjustable flow rate for passing a rate of fluid flow up to a maximum rate at least equal to the highest incremental rate change. Also, generally, the primary line in the binary section has a predetermined primary rate of flow that is preferably less than, or at least not more than, any of the predetermined rates for the secondary lines.

An example of a set of seven orifices in the binary section which provide for nominal 0.1 standard liters/minute (SLPM) increments of air flow at 2.1 kg/cm$^2$ (30 psig) pressure input is given in the table herein. These binary lines are arranged in parallel with a solid state flow rate regulator of the Fluistor TM type indicated above, having a maximum flow rate of about 0.15 SLPM which is nominally higher than the highest incremental rate in the binary section.

TABLE

| Nominal Flow (SLPM) | Actual Flow (SLPM) | Orifice Size (mm) |
|---|---|---|
| 0.1 | 0.092 | 0.061 |
| 0.2 | 0.212 | 0.089 |
| 0.4 | 0.401 | 0.119 |
| 0.8 | 0.755 | 0.160 |
| 1.6 | 1.65 | 0.239 |
| 3.2 | 3.12 | 0.475 |
| 6.4 | 6.14 | 0.660 |

Figure 2:
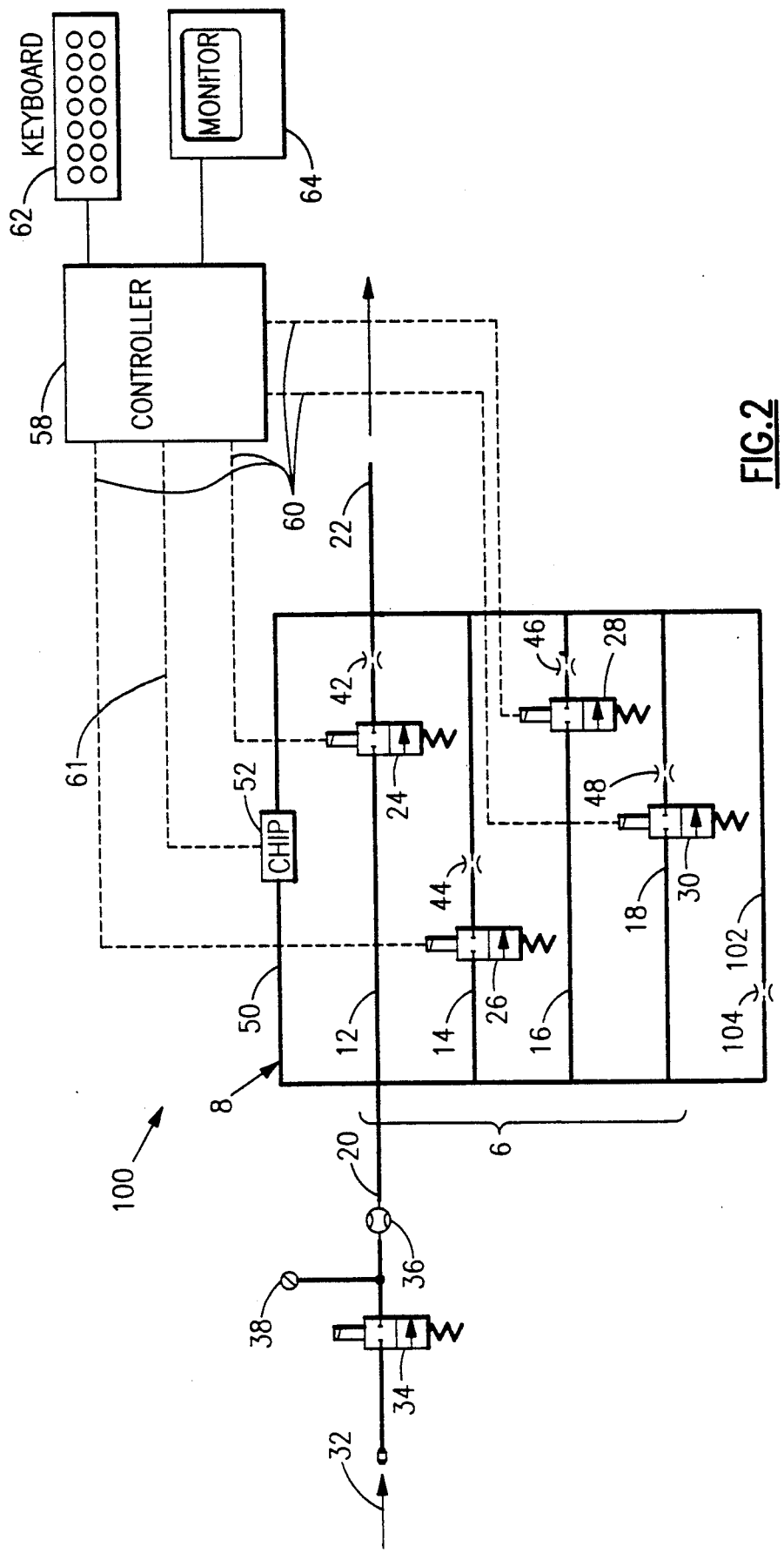
FIG. 2 is the diagram of FIG. 1 with an additional embodiment.

A further embodiment of the invention is shown in FIG. 2 which includes all of the components of FIG. 1 with the same numeral designations; the descriptions of these components are not repeated here. However, in the system 100 of FIG. 2, the binary section 6 and the analog section 8 have in parallel therewith an additional fluid line 102 that provides additional flow. It may be particularly advantageous for the additional flow to have a substantially higher flow rate than any of the individual lines in the binary and analog sections, for example 100 times the maximum flow of the latter sections.

As shown in FIG. 2, the additional line contains a precision orifice 104 or other metering means to set a predetermined additional flow rate. This line is normally open and need not contain an on-off valve although one may be included. This embodiment provides a predetermined minimum flow for the system, and is useful where an output flow requirement is normally quite large but must be adjusted within some smaller range provided by the binary and analog sections. When the main valve 34 is opened, the flow quickly reaches a full flow determined by the additional orifice and preset binary and analog lines, or the latter lines may be opened only after an initial flow is reached with the additional line.

Miniature solid state devices as described herein are particularly suitable in combination with binary lines according to the present invention, because of the high precision that may be attained for the wide range of flow rates available with binary systems. The solid state devices can have high precision but do not provide the wide range. Binary lines with precision orifices or needle valves or the like add the range while maintaining the precision. The binary lines in geometric progression allow a suitably wide range with a minimum number of binary lines where there are more than four.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

I claim:
1. A valving system for varying fluid rate, comprising:
   a common fluid inlet receptive of fluid input, and a common fluid outlet for discharging a total fluid flow;
   a plurality of binary fluid control lines having predetermined rates of flow and being connected in parallel between the common fluid inlet and the common fluid outlet, the binary lines each having therein a binary valve and a metering means for passing a predetermined rate of fluid flow to the common outlet, the predetermined rates being chosen cooperatively such that sequentially selected binary lines separately or in combination provide for sequentially increased rates of total fluid flow in increments including a largest increment;
   an analog fluid control line connected in parallel with the binary lines between the common fluid inlet and the common fluid outlet, the analog line having therein a continuously adjustable flow rate regulator for passing any selected rate of fluid flow up to a maximum rate at least equal to the largest increment; and
   controller means for setting each binary valve in a selected open or closed position, and for setting the flow rate regulator for a selected rate of fluid flow through the analog line, such that cooperative settings provide for a smoothly variable and selectable rate of total fluid flow.

2. The system of claim 1 wherein the binary lines comprise a primary line and one or more secondary lines, and the primary line has a primary rate of flow not more than any of the predetermined rates for the secondary lines.

3. The system of claim 2 wherein the binary lines have a sequential order of increasing predetermined rates, and the predetermined rate for each secondary line is twice the predetermined rate for its preceding binary line in the sequential order, the primary rate being lowest of the predetermined rates.

4. The system of claim 1 wherein the binary lines comprise a primary line and one or more secondary lines, the binary lines have a sequential order of increasing predetermined rates, the primary line has a primary rate of flow, and the predetermined rate for each secondary line is greater than the predetermined rate for its preceding binary line by a flow increment equal to twice the primary rate.

5. The system of claim 1 wherein the flow rate regulator is formed of a solid state device.

6. The system of claim 5 wherein the metering means consists of a solid member with an orifice therethrough.

7. The system of claim 1 wherein the flow rate regulator is formed of a solid state device.

8. The system of claim 1 further comprising an additional fluid line connected in parallel with the binary lines and the analog line between the common fluid inlet and the common fluid outlet, the additional line having therein an additional metering means for passing an additional predetermined rate of fluid flow to the common outlet, the additional line being normally open so as to pass a minimum flow to the common fluid outlet at the additional predetermined rate.

* * * * *